Aug. 14, 1956     I. B. HUMPHREYS     2,758,582

CONTROLLED COMPRESSION INTERNAL COMBUSTION ENGINE

Filed Oct. 22, 1953     2 Sheets-Sheet 1

INVENTOR.
I. B. HUMPHREYS
BY
ATTORNEY

Aug. 14, 1956  I. B. HUMPHREYS  2,758,582
CONTROLLED COMPRESSION INTERNAL COMBUSTION ENGINE
Filed Oct. 22, 1953  2 Sheets-Sheet 2
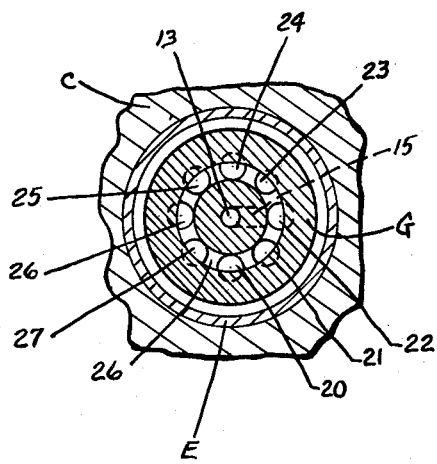
Fig. 2
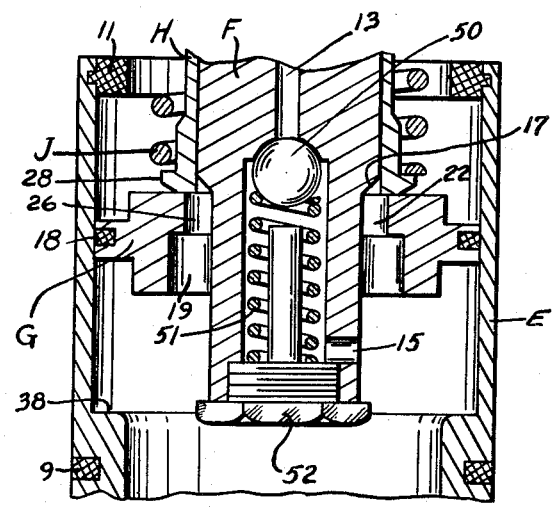
Fig. 3
INVENTOR.
I. B. HUMPHREYS
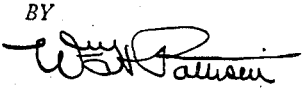
ATTORNEY

United States Patent Office 2,758,582
Patented Aug. 14, 1956

2,758,582

CONTROLLED COMPRESSION INTERNAL COMBUSTION ENGINE

Ira B. Humphreys, Denver, Colo., assignor to The Humphreys Investment Company, Denver, Colo., a corporation of Colorado Application October 22, 1953, Serial No. 387,711

8 Claims. (Cl. 123—48)

This invention relates to internal combustion and compression ignition engines, but comprises more particularly and specifically a construction making or converting such engines into controlled compression engines in which the compression pressure or compression ratio is automatically controlled with the increase or decrease of the R. P. M. of such engines.

The invention has similarity to but constitutes an improvement of the internal combustion engine disclosed in my pending application for patent Serial No. 92,710, filed May 11, 1949, in that in the referred to application the invention is primarily directed to improvement in the efficiency of an engine operating at less than peak power by the maintenance of a constant compression in the engine, whereas the present invention has not only the advantages of the engine of the referred to application but the additional advantage of automatically controlling the effective compression ratio of the engine to obtain the advantage of maximum power across the entire range of engine speed.

Fuel economy and engine power are increased in engines of the character described by the use of high compression ratios, and as a consequence the trend in engine design over a number of years has been to engines having higher compression ratios. The compression ratios that can be utilized are, however, limited by the non-detonating properties, usually referred to as the octane ratings, of the fuels which are commercially and economically available.

It is known that in engines, as commonly built today, the full advantages of a high compression ratio engine are available only at relatively open throttle conditions or high power demand and that under other conditions or demands no fuel economy or increase in engine power is attained by the use of extra high octane fuels the non-detonating properties of which would permit higher compression ratio engines. The reason for this is that at low throttle settings only a partial or small fuel-air charge is admitted or drawn into the compression chamber of the engine with the result that the effective compression ratio of the engine is lowered. As an example, in a conventional engine having a 7½ to 1 compression ratio the "effective ratio" or actual compression will, with low or partially open throttle settings, be far below the above stated ratio. As a result of the facts set forth above, a conventional engine with a fixed compression ratio, in the commonly accepted sense of these words, will at a fully or nearly fully open throttle but only at low speed, utilize to the full advantage the properties of the fuel being used and thereby attain fuel economy and engine power. As a further result, with a lesser throttle setting and at any of the speeds within the engine range, the effective compression ratio is decreased with a resultant reduction in the efficiency of operation of the engine compared to what might otherwise be attained.

The present inventive concept is broadly that of building into an engine of the character described or providing for easy conversion of such an engine, a construction which during the operation of the engine will automatically maintain in the compression chambers thereof a compression just below the detonation or pre-ignition pressure of the fuel being used and will assure such a pressure irrespective of the engine speed to thereby obtain the maximum efficiency of the engine throughout or across the range of speed attainable by the engine.

In the attainment of the primary object of the invention, the volumetric capacity of each of the combustion chambers of the engine is automatically increased and decreased by the construction hereafter to be specifically described by reference to the accompanying drawings, which illustrate an embodiment of the inventive concept but do not necessarily describe and illustrate the only mechanical design or arrangement by which the inventive concept could be practiced, and are accordingly to be considered as illustrative and not limitative of the invention.

It is known that, as engine speed is increased, it is possible to increase the compression ratio without detonation. As an example, an engine which operates at a compression ratio of 7½ to 1 without detonation at full throttle at low speed will at high speed and maximum power run without detonation at a compression ratio of from 10 to 1 to 12 to 1. The present invention has been conceived and designed, among other things, to take advantage of the fact that higher compression ratio can be attained without detonation at higher engine speeds.

To the end of attaining and maintaining a predetermined maximum compression pressure in the combustion chambers of an engine of the character described, the present invention described in general terms comprises the provision of a portion of the wall of each combustion chamber in the form of an element which is movable outwardly and inwardly in respect to the combustion chamber and thereby increase and decrease the volumetric capacities of the combustion chambers. In the specific construction illustrated and described, the movable element is what I term a compression ratio control piston and this piston is backed up by a body of fluid which is oil and which is confined within a compartment. This compartment is variable as to size and is composed of the control piston and a cooperating valve seat and escape or dump valve. The arrangement is such that when the compression pressure in a combustion chamber exceeds a predetermined maximum a portion of this fluid is allowed to escape past the dump valve and thereby permit an outward movement of the control piston, which piston movement continues until the pressure within the combustion chamber is returned to the predetermined maximum. Fluid is available for delivery to the fluid confining compartment or chamber and this delivery is by an oil pump driven by the engine and which operates to deliver oil at an increased pressure upon an increase of engine speed. This oil delivery varies the pressure on the dump valve and thereby automatically maintains the movable control piston in the proper position to maintain the predetermined compression pressure in the combustion chamber but below the detonation or pre-ignition pressure of the fuel being used. This oil delivery also keeps the oil or fluid confining compartment or chamber filled with fluid. Due to the arrangement provided, should the compression pressure in the combustion chamber fall below the predetermined maximum by reason of a reduction in throttle setting or any other cause, the control piston will move inwardly toward the combustion chamber the correct distance to make the volumetric capacity of the combustion chamber proportionately proper with respect to the fuel air intake and engine speed to establish in the combustion chamber the predetermined compression pressure.

Engines of the general type referred to above are broadly not new and patents have issued upon such engines, but those engines of this character thus far conceived have not proved successful in commercial use, and particularly in this the case as respects engines which are suddenly and sometimes violently accelerated, as are engines in automobiles and airplanes.

Such engines and attachments therefore which have been heretofore conceived and patented have been found to have numerous and critical shortcomings which render them unsuitable for practical and commercial usage. The present invention has been conceived to overcome these deficiencies and inadequacies of prior devices and provides an improved and novel construction which is commercially practical and usable.

A feature found to be common to prior devices and constituting one of the critical deficiencies thereof, is that when the fluid confined in the compartment or chamber is permitted to escape at the time the movable wall element, that is the control piston, moves outwardly to prevent the generation in the combustion chamber of a pressure greater than the predetermined maximum, this discharge or escapage of the fluid or oil from its confining compartment or chamber is not free and rapid.

The construction and arrangement of the present invention is such that the fluid discharging from, that is permitted to escape from, the fluid confining compartment escapes or discharges freely into a reception and conveying receptacle and conduit at atmospheric pressure. Further, a construction and arrangement is provided to reduce to the greatest possible degree any resistance whatever to the free discharge or escape of the fluid with the result that the fluid can escape against substantially no pressure so as to overcome the possibility of building up back pressure which might be generated in the column of fluid as and after it passes from the receiving compartment.

In prior devices a common feature has been found to be that no provision is made to prevent air or gas from being trapped in the fluid confining compartment or chamber. The present invention provides a construction which assures against entrapment of air or gas in the fluid by preventing entrapment of air or gas in the fluid confining container.

A common deficiency found in prior art devices and arrangement is their inability to respond or act with sufficient rapidity in response to violent or rapid change of throttle settings. The construction and arrangement of the present invention is such that response and action of the combustion chamber compression controlling device will with sudden changes in throttle settings function practically instantaneously to assure the predetermined compression pressure and thereby prevent knocking, that is detonation, or preignition, upon sudden and violent increased throttle settings.

The drawings illustrate in vertical section those portions of an engine of the internal combustion type which has been converted by the application of the present invention. Only a single cylinder of an engine is illustrated but the invention is applicable to an engine irrespective of the number of its cylinders and whether it be two or four cycle. The particular fuel used with the engine is not critical so far as the anti-knock characteristics or octane rating of the fuel is concerned, but a greatly improved operation on the lower octane fuels is obtained by the use of the invention by reason of the controlled compression and the controlled effective ratio of compression in accordance with the engine speed.

In the drawings:

Fig. 2 is a horizontal sectional view on the line 2—2 of Fig. 1 looking in the direction indicated by arrows.

Fig. 3 is an enlarged fragmentary vertical sectional view illustrating a slight modification of the construction illustrated in Fig. 1.

Figure 1:
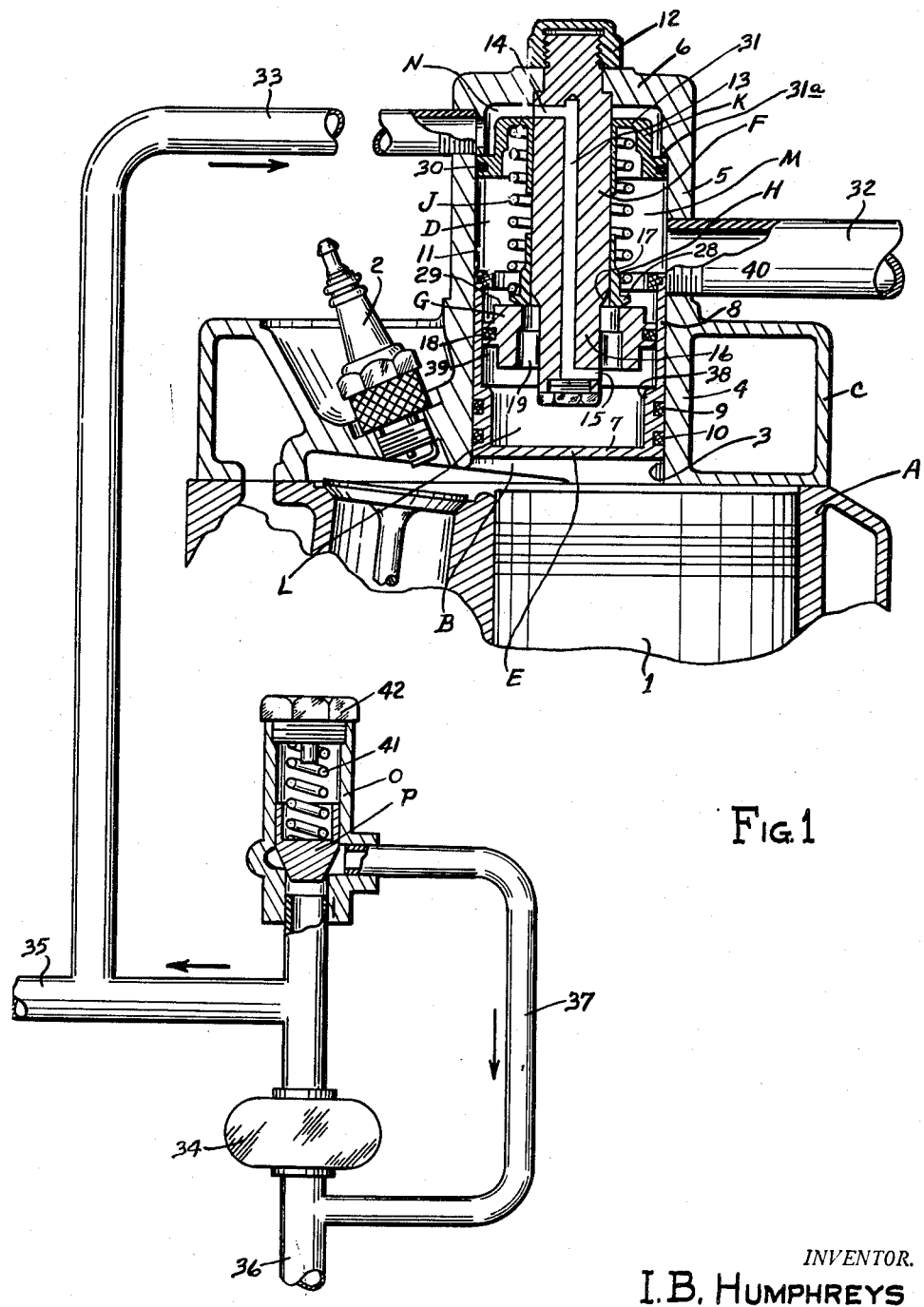
Fig. 1 is a vertical sectional view illustrating the invention in combination with a cylinder of an internal combustion engine.

Referring to Fig. 1, a conventional cylinder A carrying a conventional reciprocatory piston 1 is provided at its upper end with a conventional combustion chamber B. Further description of the construction and operation of a conventional internal combustion engine is unnecessary to an understanding of the invention.

The controlled compression unit constituting the invention can be built into the engine at the time of its manufacture or can be provided as an attachment or improvement to a previously built conventional engine. It will be understood that in respect to multi-cylinder engines the controlled compression unit or arrangement illustrated will be duplicated and provided for each cylinder of the engine.

Ordinarily the cylinder head C is imperforate unless it is provided with openings for the reception of spark plugs and/or valves. The engine illustrated does carry a spark plug 2 in its head. The present cylinder head is provided with an opening 3 which is preferably, although not necessarily, cylindrical in shape. This opening is provided with a surrounding wall the lower end of which is 4, the upper end 5 and has a closed top 6. The surrounding wall and top provide or define the location of a secondary or control cylinder D within which is disposed the construction which automatically controls the compression within the combustion chamber B. Obviously, the control cylinder can be made as an integral part of the cylinder head, as is illustrated, or could be a separate unit attached to the cylinder head in any suitable manner.

It will be seen that the lower end of the control cylinder is open for unobstructed communication with the combustion chamber and as a consequence thereof forms a part of the volume of the combustion chamber and that the combustion chamber volume can be varied by placing in the control cylinder a reciprocatory movable element.

For the purpose of controlling the volume of the combustion chamber a control piston E is reciprocable within the control cylinder. This piston is inverted in respect to the main engine piston 1, that is to say, its head 7 opposes the head of the engine piston. This piston is hollow and its wall or skirt 8 is provided with rings 9 and 10. Additionally, the end of the control piston wall carries a ring 11 the purpose of which will hereinafter appear.

A stem F of much smaller diameter than the control cylinder extends downwardly into the cylinder being supported from head 6 thereof by any suitable means such as the nut 12. This stem is provided with a longitudinally extending passageway 13 having at its upper end an inlet 14 and at its lower end an outlet 15. This stem has a lower end portion 16 of reduced diameter and the stem carries a valve seat G. This seat is disposed within the control piston E but is of lesser diameter than the interior of the piston. The seat is provided with a ring 18 which bears against the interior face of the wall 8 of the piston E. For a portion of its thickness the upper or top side of the seat is bored out as at 26 and a series of holes, see Fig. 2, 20, 21, 22, 23, 24, 25, 26 and 27 extend through the remaining thickness of the seat. This arrangement provides a passageway which is disposed closely adjacent the stem.

Valve H, which I term a dump valve, surrounds the stem F above the seat G and has a head 28 resting on the top or face 29 of the valve seat and serves to close the open top of the groove or channelway 26.

A coil spring J surrounds the valve-seat-carrying stem F and has its lower end resting upon the head 28 of the dump valve while its upper end engages the under side of what I term a pressure piston K. This piston is reciprocable along the stem F and is provided with a ring 30 engaging the interior face of the control cylinder D.

Normally the head 31 of this piston is disposed just below the inlet 14 of the stem passageway 13, due to the shoulder 31a.

From the construction thus far described, it will be seen that there is a compartment L formed between the control piston head E and the valve seat and that the size of this compartment will vary upon movement of the control piston. Between the valve seat and the pressure piston, a receptacle M is formed. The space N above the pressure piston K, I term a fluid reception area as this is constantly in communication with the inlet 14 of the stem passageway 13.

The receptacle M is provided with a discharge conduit 32 which is of considerable diameter and is in communication with the crank case of the engine.

The fluid reception area or space is supplied with oil through a conduit 33 by an oil pump 34 which is suitably driven by the engine so that as the engine speed increases the pressure in the conduit 33 is increased. This same pump may deliver lubricating oil to the engine through the conduit 35 which is common to the conduit 33. The conduit 36 interconnects the oil supply in the engine crank case and the oil pump 34. A valve O and a bypass conduit 37 are provided in the oil line and the purpose of these will be later described.

The control piston is provided with a shoulder 38 to limit the upward movement of the piston and this shoulder is of a size to enter the space 39 between the valve seat and the interior face of the piston wall so that a dash pot action is obtained, as will appear later when it is described that the compartment L is always full of oil. The snap ring 11 at the upper end of the control piston is of a size to enter the space 40 between the valve seat and the interior face of the piston to limit the downward movement of the control piston and to obtain a dash pot action.

Oil is constantly available for delivery to the compartment L and hence this compartment is at all times full of oil. Oil can escape from the compartment L only through the dump valve and this can occur only when this valve is lifted against tension of the coil spring J. The load of this spring is set or determined under conditions of low speed-heavy load of the engine so as to cause the oil in the compartment L to position the control piston E to create a volumetric capacity in the combustion chamber which will give a compression just under incipient detonation. It is also necessary to correlate the valve O in the oil supply line. This valve embodies a conical shaped valve element P held on its seat by adjustable resilient tension through the coil spring 41 the tension of which is adjustable by the screw nut or cap 42. This valve is adjusted so that at the idling speed of the engine the oil pressure entering the fluid reception area N through the conduit 33 is the designed pressure of the engine lubricating system and a like pressure of the oil would exist in the stem passageway 13 and the outlet 15 thereof into the compartment L. At low speed-heavy load, the present value or pressure on the dump valve would of course be compatible with the fuel and engine design and might be fairly low.

Should the valve O open or partially open, some of the oil being delivered by the pump would travel through the return or offset pipe or conduit 37 to the oil pump intake conduit 36. This valve will function to permit a controlled increase of the pressure of the oil in the conduit 33 and the communicating passageway 13 as the volume of oil delivered by the oil pump increases in response to an increase in engine R. P. M. The valve O functions merely as a needle valve in that it will bleed off a precalculated portion of the increased volume of oil delivered by the pump as the engine and pump R. P. M. is increased. This rate of increase of pressure is controlled by the taper on the valve element P or by the stiffness of the valve spring 41, or by a combination of both.

As the engine is speeded up and the volume of oil delivered by the oil pump 34 is increased the oil pressure in the fluid reception area N above the pressure piston K is increased thus tending to force the pressure piston downwardly, which increases the pressure of the coil spring J on the dump valve thus requiring a greater combustion pressure in the combustion chamber to move the control piston E upward to cause the oil therein to elevate the dump valve and escape into the receptacle M for unobstructed discharge through the outlet conduit 32.

Thus it will be seen that the arrangement takes advantage of the fact that compression ratio can be increased with an increase in engine speed without incipient detonation. All that is necessary to prevent incipient detonation is to assure that the compression ratio increase does not increase more rapidly, that is overrun, the speed-compression ratio relationship for the particular fuel upon which the engine is being operated. The valve O in the oil supply line is constructed and calibrated so that the compression ratio at all engine speeds is near the maximum allowable compression ratio which can be attained without incipient detonation.

For instance, in an engine having an oil pressure regulated at 25 to 30 pounds at idling speed of the engine the valve O functions to permit the pressure to build up to from 50 to 60 pounds at 4000 R. P. M. With this setting it has been found that the full throttle compression ratio of the engine is about 7 to 1 at 500 R. P. M. and increases to 10–12 to 1 at 4000 R. P. M. and that the constant speed-level road compression ratio is from 12–14 to 1 at any speed.

This engine without the automatic increase of pressure upon the dump valve upon an increase in engine R. P. M. would provide a constant compression engine such as that disclosed in my pending application heretofore referred to, but with the automatic increase of pressure upon the dump valve attained by the automatic increase of oil pressure occurring when the engine R. P. M. is increased the engine becomes a controlled compression engine in which the compression ratio varies from a comparatively low ratio at full throttle slow engine speed to a higher ratio as engine speed increases.

It is important in the accomplishment of proper engine operation upon rapid acceleration and deacceleration that the present control operate satisfactorily. To the accomplishment of this, it is very important that when the combustion pressure in the combustion chamber closely approaches the condition of incipient detonation of the fuel that the control piston E move rapidly outwardly from the combustion chamber to increase the size thereof. To permit this rapid movement oil must discharge rapidly from the compartment L and this escape must be against substantially no pressure. The liquid or oil escapes into the very large receptacle M which has a capacity equally as large as that of the compartment L and in addition is provided with the large discharge conduit 32.

Noise in the operation of the control piston E is eliminated due to the dash pot action when this piston nears the limit of its movement in either direction, and additionally this dash pot action on the extreme movements of the control piston eliminates sudden jar or abuse which in the absence of the dash pots could occur upon the two extremes of movement of the piston.

It will be seen that as the control piston due to operating conditions is caused to move outwardly, oil is discharged from the compartment L. When conditions are such that the compression ratio should be increased, the control piston E will be automatically moved inwardly by the oil being supplied to this compartment above or within the control piston through the outlet 15 of the stem oil passageway 13. From the foregoing it will be seen that insofar as concerns the provision of a movable combustion wall element, namely a piston movable toward and away from the combustion chamber, the present invention has similarity to my referred to pending application, but the arrangement in that application lacks the automatic increase of pressure upon the dump valve upon an increase in engine R. P. M. with the result that the engine of the prior application does not provide the controlled compression-speed relationship which constitutes the inventive concept of the present application. Thus the present invention provides an engine in which the maximum power is available across or throughout the entire range of engine speed.

The degree to which the compression ratio of a given octane fuel can be increased upon an increase of engine speed without probability of detonation, can be determined and will guide the construction of the relief valve O, or some equivalent mechanism, so that the increase in oil pressure will not over-run the speed-compression ratio relationship for the fuel being used. Accordingly the mechanism will automatically position the control piston L to maintain in the combustion chamber a compression ratio, at all engine speeds, just under the detonation pressure of the fuel at any and all of the ranges of speed at which the engine operates.

The modification illustrated in Fig. 3 of the drawings differs from the described form of the invention only in the provision of a valve in the oil passageway 13 of the stem F. This valve, which is adjacent the outlet 15 of the passageway, is in the form of a ball 50 held on its seat under adjustable resilient tension by a coil spring 51 and the adjustable cap or screw 52. This valve is not essential to an operable device and is desirable only and would be used only if unusually low oil pressure were for some reason desired at low engine speed. In all other respects the modified form of the invention is similar to the first described form and accordingly like reference numerals designate similar parts.

What I claim is:

1. In an internal combustion type engine, a cylinder having a combustion chamber and a working piston in the cylinder, a movable element for increasing and decreasing the volume of the space within the combustion chamber to increase or decrease the compression pressure within the combustion chamber to increase and decrease the compression ratio of the engine, a confined fluid acting to position the movable element to maintain a predetermined compression pressure in the combustion chamber, a loaded valve controlled escape of the confined fluid, and means controlled by the engine speed for automatically increasing the volume of the confined fluid to position the movable element to progressively increase the compression pressure of the engine as the engine speed is increased and to simultaneously progressively increase the loading of the valve.

2. In an internal combustion type engine, a cylinder having a combustion chamber and a working piston in the cylinder, means for increasing and decreasing the volume of the space within the combustion chamber comprising an element forming a portion of a wall of the combustion chamber and movable outwardly and inwardly in respect to the combustion chamber, a comparatively noncompressible normally confined body of fluid behind the movable element for positioning said element and preventing outward movement thereof, a normally closed dump valve controlling the escape of said fluid from behind the element, means of loading the valve to permit opening of the valve only in response to a predetermined degree of pressure existing in the combustion chamber and exerted upon it by the confined fluid, fluid supplying means driven by the engine and supplying fluid under pressure and at progressively increasing pressure upon increase of engine speed, and the pressure of the fluid supplied by said supplying means being exerted upon the normal loading of the valve to progressively increase the loading thereof upon increase in engine speed, and said increased loading on the valve at all times being controlled so that the valve will open when the pressure existing in the combustion chamber closely approaches that of incipient detonation of the fuel being used to operate the engine.

3. In an internal combustion type engine, a cylinder having a combustion chamber and a working piston in the cylinder, means for increasing and decreasing the volume of the space within the combustion chamber comprising an element forming a portion of a wall of the combustion chamber and movable outwardly and inwardly in respect to the combustion chamber, a compartment at the outer side of said element and filled with and confining a comparatively non-compressible body of fluid, said element forming one of the walls of said compartment, the compartment being provided with an outlet, a normally closed valve controlling said outlet, means loading the valve to open only in response to a predetermined degree of pressure existing in the combustion chamber and exerted upon it by the confined fluid, a fluid reception receptacle into which fluid in the compartment can, when the valve is open, rapidly escape substantially free of opposition, a fluid supply means supplying fluid under pressure at slow engine speed and supplying fluid at progressively increasing pressure upon increases of engine speed, said fluid supply means having communication with the compartment and simultaneously exerting pressure upon the loading of said normally closed valve to increase the loading thereof upon an increase in engine speed, and said increased loading of the valve by the increased fluid pressure being controlled to permit the valve to open when the compression in the combustion chamber is just under the incipient detonation pressure of the engine fuel at the particular speed at which the engine is operating.

4. A construction as defined in claim 3 wherein, the movable element is a piston the head of which constitutes one wall of the compartment, the valve and its seat constituting another wall of the compartment, and the fluid supplying means constituting an oil pump driven by the engine at variable speed and pressure upon variation in engine speed.

5. A construction as defined in claim 2 wherein, the fluid supplying means is an oil pump driven at increased speed and increased volume output upon an increase in engine speed, and a relief valve associated with said pump and acting to control the pressure of the oil delivered thereby to increase the loading of the dump valve to the degree necessary to maintain in the combustion chamber a compression pressure just under the incipient detonation point of the engine fuel at the particular speed at which the engine is operating.

6. A construction as defined in claim 2 wherein, the loading on the dump valve is in the form of a coil spring, a pressure piston in engagement with said spring, and the fluid supplied by said fluid supplying means acting on said pressure piston to progressively increase the loading on said spring to attain the progressively increasing compression pressure defined.

7. In an internal combustion type engine, a cylinder having a combustion chamber and a working piston in the cylinder, a reciprocable element forming a portion of a wall of the combustion chamber and being movable outwardly and inwardly in respect to the chamber to increase and decrease the volume of the space within the combustion chamber to increase or decrease the compression pressure within the combustion chamber to increase and decrease the compression ratio of the engine, loaded yieldable means acting to hold said reciprocable element against outward movement until a predetermined degree of pressure has been exerted upon the element by the compression pressure within the combustion chamber, means operated by the engine moving the reciprocable movable element progressively inward towards the combustion chamber as the engine speed is progressively increased, and said last named means acting to simultaneously progressively increase the load on the said loaded yieldable means to progressively increase the degree of pressure necessary to be exerted upon said reciprocable movable element to move it outwardly in respect to the combustion chamber.

8. In an internal combustion type engine, a cylinder having a combustion chamber and a working piston in the cylinder, a reciprocable movable element for increasing and decreasing the volume of the space within the combustion chamber to increase or decrease the compression pressure within the combustion chamber to increase and decrease the compression ratio of the engine, means acting to position the movable element to maintain a predetermined compression pressure in the combustion chamber, loaded yieldable means permitting movement of the reciprocable movable element in a direction to increase the volume of the space within the combustion chamber only upon the exertion of a predetermined degree of pressure upon the movable element, means operated by the engine moving the reciprocable movable element progressively towards the combustion chamber as the engine speed is progressively increased to decrease the volume of the space within the combustion chamber to thereby increase the compression pressure of the engine as the engine speed is progressively increased, said last named means acting to simultaneously increase the load on said loaded yieldable means to progressively increase the degree of pressure needed to be exerted upon the reciprocable movable element to move it in a direction to increase the volume of space within the combustion chamber, and means regulating said last named means to control the degree of additional load added to the loaded yieldable means to thereby set the compression pressure just under incipient detonation of the engine fuel at any particular speed at which the engine is operating.

References Cited in the file of this patent

UNITED STATES PATENTS

| | | |
|---|---|---|
| Re. 23,307 | Kratzer | Dec. 12, 1950 |
| 2,142,621 | Tsuneda et al. | Jan. 3, 1939 |
| 2,467,568 | Rosaen | Apr. 19, 1949 |

FOREIGN PATENTS

| | | |
|---|---|---|
| 798,013 | France | Feb. 24, 1936 |